J. B. BENTON.
Passenger Register.

No. 167,057.  Patented Aug. 24, 1875.

Witnesses  
Carl Frederici  
Edward A. Griffith

Inventor  
John B Benton

J. B. BENTON.
Passenger Register.
No. 167,057. Patented Aug. 24, 1875.
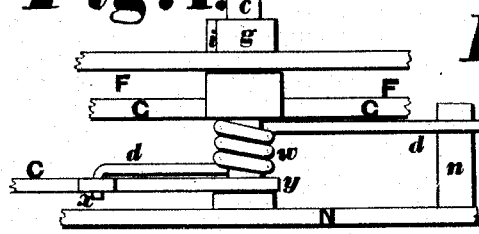
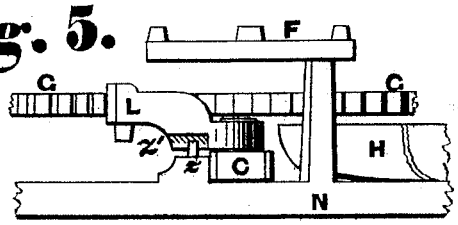
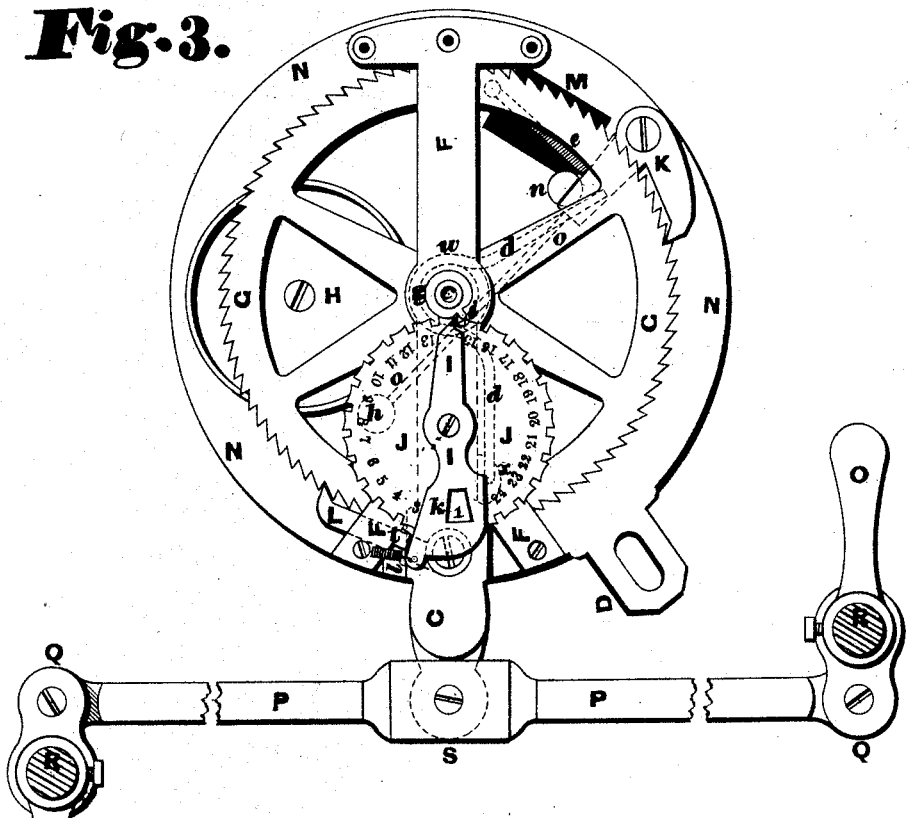
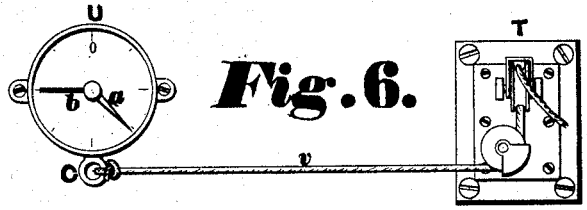
Witnesses.
Carl Frederick
Edward A. Griffith
Inventor
John B. Benton J. B. BENTON.
Passenger Register.

No. 167,057.

Patented Aug. 24, 1875.

Witnesses.
Carl Frederici.
Edward A. Griffith

Inventor.
John B. Benton

N. PETERS, PHOTO-LITHOGRAPHER, WASHINGTON, D C.

4 Sheets--Sheet 4.
J. B. BENTON.
Passenger Register.
No. 167,057. Patented Aug. 24, 1875.
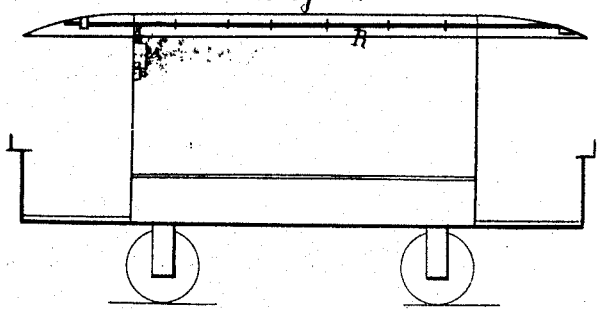
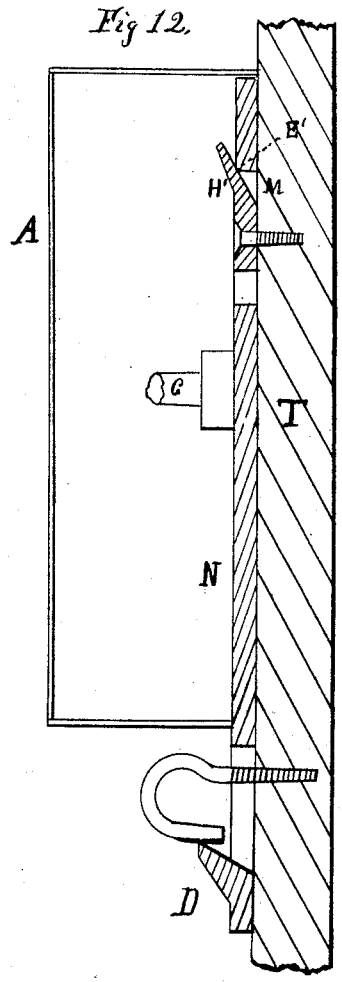
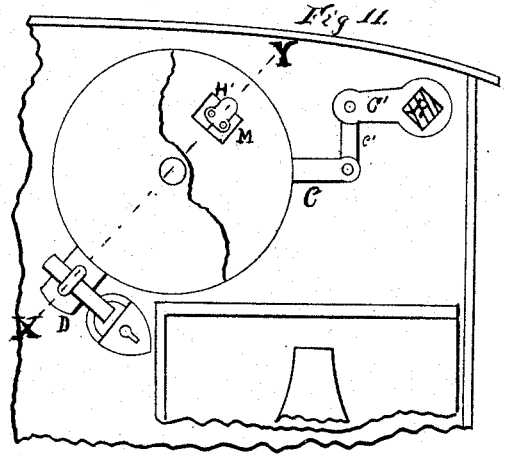
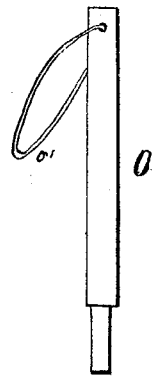
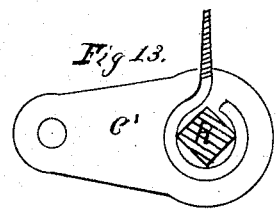
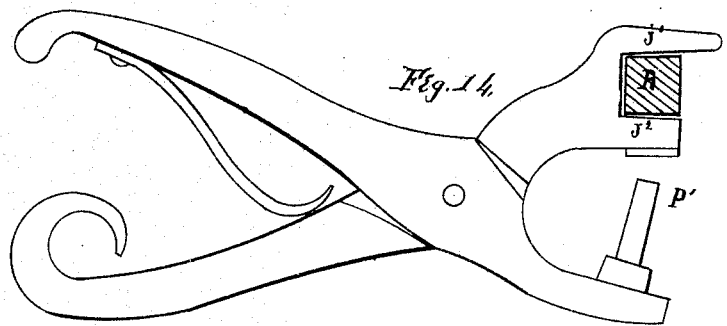
WITNESSES
F. B. Townsend.
C. Clarence Poole
INVENTOR
John B. Benton
By Wm Frank Browne
His Attorney

UNITED STATES PATENT OFFICE.

JOHN B. BENTON, OF NEW YORK, N. Y., ASSIGNOR OF HIS RIGHT TO HAMILTON E. TOWLE, OF SAME PLACE.

IMPROVEMENT IN PASSENGER-REGISTERS.

Specification forming part of Letters Patent No. 167,057, dated August 24, 1875; application filed March 18, 1875.

*To all whom it may concern:*

Be it known that I, JOHN B. BENTON, civil engineer, of city, county, and State of New York, have invented some new and useful improvements in machinery for registering the number of passengers entering cars, and for various other purposes of a similar nature; and I do declare the following to be a full and exact description thereof, reference being had to the accompanying illustrations, which form an essential feature of the following specification.

The object of this invention is to record the number of fares taken from passengers while riding in or upon public vehicles, and for entering places of public amusements; also, it can be used for various purposes where consecutive numbers are to be recorded.

Figure 1 represents a front view of the machine ready for operation. Fig. 2 is a plan of the machine, showing the internal parts thereof. Fig. 3 is a view similar to the one shown in Fig. 2, with an addition of rods and handles for operating the same. Fig. 4 is a broken vertical and sectional view representing some of the working parts. Fig. 5 is a broken view, showing the position of the pawl and its connection with the ratchet-wheel. Fig. 6 represents a modification of Fig. 3, showing how the register can be operated by cords and pulleys. Fig. 7 is a front view of the machine, showing two auxiliary dials or detecters. Fig. 8 is a vertical section of Fig. 7. Fig. 9 is a detached sectional view of Fig. 8. Fig. 10 is a longitudinal section through a horse-car, showing the position of the case A containing the mechanism, and the rod running through the car, hereinafter specified as rod R. Fig. 11 is an inside view of the end of the car, with the registering instrument's shell or case in position, and connected to the rod R by means of suitable levers. Fig. 12 is a sectional view through the case A, on the line of X Y in Fig. 11, showing the horn or hook and staple, as also the opening for the horn in the back or base of the machine. Fig. 13 is a cross-section of the rod R, elevation of one of the supports of the same, and also of the lever C' on the rod R, from which connection is made to the actuating-lever C. Fig. 14 is the wrench, shown with the jaws $j^1$ and $j^2$ of the same clasping the rod R; also in combination with a punch, P'. Fig. 15 is a cross-section of the frictional sleeve $s'$, supported on the shaft $c$, showing also the tightening-spring $s\ s$. Fig. 16 is an elevation of a portable pin or lever, to move the rod R by inserting in a hole or holes arranged at convenient distances along said rod.

Similar figures and letters refer to corresponding parts in all of the views.

In Fig. 1, A represents the case or covering to the registering mechanism, B being the graduated dial-plate thereto. C is an actuating-lever, whereby the recording mechanism is moved. D is a lug or projection, cast or otherwise secured to the base of the machine, and by which it may be held and properly secured to any desired location. E is an aperture, through which a series of consecutive numbers are seen upon a revolving dial beneath the dial-plate B. $a$ and $b$ are two indexes or hands secured to the central shaft $c$. N N, in Fig. 2, represent the base of the machine, made of cast-iron or other suitable material, all of the necessary apertures and projections being cast therewith. M is an aperture opposite the lug D, these two features being the means employed to hold the machine in the required location. F is a bar extending across the diameter of the machine, and resting upon posts projecting from the base N N. G is a ratchet-wheel with one hundred teeth on its circumference. L represents a pawl secured to the actuating-lever C, and working in conjunction with the teeth on the wheel G. K is a retaining-pawl, for holding the forward movement of the ratchet-wheel. To this pawl the rod $o$ is secured, as shown in dotted lines. To the opposite end of this rod the hammer $h$ is attached, for the purpose of striking the bell H. $n$ is a stop, against which the pawl K strikes, $e$ being a coiled spring for keeping the pawl in contact with the circumference of the wheel G. The spring $f$ operates on the pawl L for a like purpose. $d\ d$ is a spring coiled around the post $q$, with one end resting against the stop $n$, while the other presses against the actuating-lever C, which turns on the fulcrum $j$. I represents a cover-plate placed over the dial J, both turning on a common center when actuated by the tooth $i$, which projects from the hub $g$. This hub is secured to the shaft $c$, and receives its motion therefrom. $k$ is an aperture in the cover-plate I, through which the consecutive figures on the dial J are seen. $t$ is a spring, which keeps the cover-plate I in position against the stop $l$ when not actuated by the tooth $i$.

In Fig. 3, P P represent a rod or bar, connected to, and at right angles with, the actuating-lever C, also connected by a crank-joint, Q, to the rod R. O is a handle, which represents a series of handles on the rod R, whereby a movement can be given to the actuating-lever C. A square rod or its equivalent can be used in place of the round rod R, and unprovided with handles. The movement can be given to it by applying a wrench or hook.

The positions of the working parts shown in Fig. 3 are differently arranged from those seen in Fig. 2, the dial J being placed below the central shaft C instead of above, as shown in the former figures; also, the actuating lever and spring are secured to the shaft C instead of separate points, as will be seen by referring to Fig. 2.

In Fig. 4, N represents the base of the machine; C, the actuating-lever, with its inner end secured to the shaft $c$. $d\ d$ are the two ends of a coiled actuating-spring, $w$. One of the ends is seen resting against the stop $n$, while the other end is fixed to the actuating-lever C at the point $x$. G indicates the position of the ratchet-wheel; F, the cross-bar; and $g$, a hub, with the actuating-tooth $i$ thereon.

Fig. 5 represents a broken view, showing a part of the base N, with a post and projection, $z$, cast thereon. C is the end of the actuating-lever, to which one end of the pawl L is secured, while the other end of the pawl is seen resting against the teeth on the circumference of the wheel G.

Fig. 6 is a modification of Fig. 3, showing how a cord or chain may be employed in place of the rod R for giving motion to the actuating-lever of a registering-machine when used in or on a public conveyance.

Figure 8:
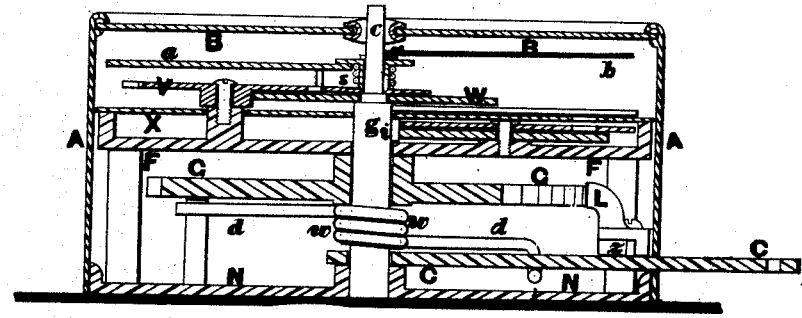

In vertical section, Fig. 8, N N indicates the base of the machine; A A, the case inclosing the recording mechanism. C is the actuating-lever; $w\ w$, a coiled spring, terminating in two levers, $d\ d$. G represents the ratchet-wheel, which is moved by the pawl L. F F is a cross-bar, resting on posts which project from the base N N. V and W are detecting-dials. $a$ and $b$ are two indexes indicating the number of movements made by the actuating-lever C. $s$ represents a spiral spring inclosing a frictional sleeve, which causes the hand $a$ to move with the recording mechanism, and also to be moved by inserting a key without moving any of the other parts. $c$ is the main shaft, to which the lever C, spring $w$, wheel G, detecter-dial W, and indexes $a$ and $b$ are properly secured.

Figure 9:
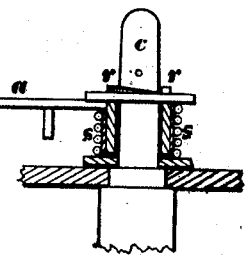

Fig. 9 represents a detached sectional view, showing the frictional sleeve and spring $s$, also two inclined projections, $r\ r$, against which the key strikes when the hand is to be moved without the aid of the mechanism.

Figure 1:
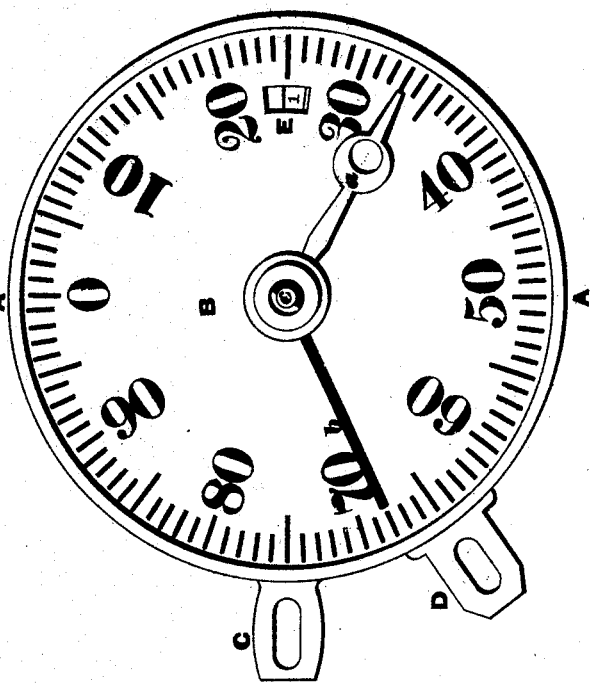
Figure 2:
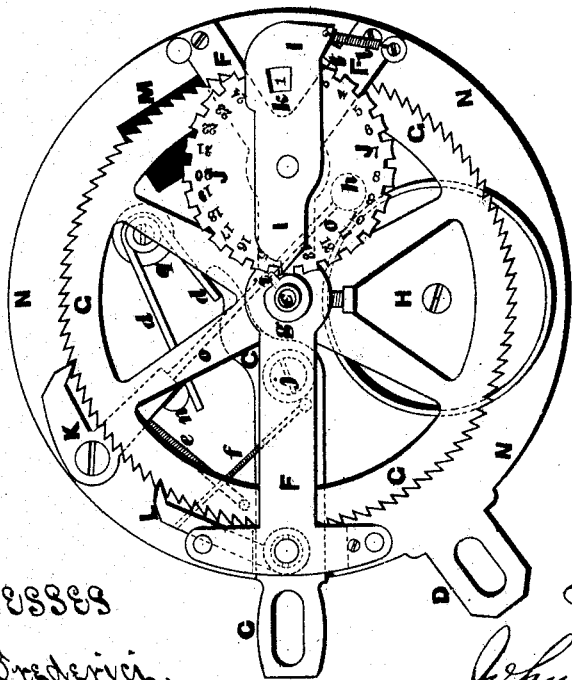

This machine, as seen in Fig. 2, is especially adapted to be actuated by pulls on a strap, while in Fig. 3 I show connecting-rods and levers so arranged in or about a car, or any other public conveyance, that they may be easy of access, whereby the conductor or person having charge of the vehicle can, by a movement of any one of the series of levers, record upon the dial B the number of passengers entering the vehicle.

The device shown in Fig. 6 may be used for the purpose of communicating motion to the actuating-lever C, thereby causing the required indications to be shown on the dial B. By a suitable arrangement of cords and pulleys the registering-machine can be operated from the outside of the vehicle; also, the same may be done with rods.

The object of my invention is to produce a machine which at all times shows on the dial B three distinct results, namely: First, the number of pulls the lever C has received since the machine was first started, with the two hands $a$ and $b$ at zero; second, the number of pulls it has received since the adjustable hand was last placed at zero, and, third, the number of times the adjustable hand has passed zero.

Besides the indications above described, the machine is made to strike a blow on a bell, thereby giving notice that an indication has been made. Therefore, it will be seen that I produce a machine that not only indicates the number of passengers by corresponding pulls given to the actuating-lever C on any trip, and the totals for several trips independently of each other, but also the number of times the trip or adjustable hand $a$ has passed zero, the object of which is to prevent tampering with the trip-hand, which might be set forward to any desirable point on the dial to deceive a detective without pulling the strap; and at some other points on the route, after the passengers have left the car, it can be set back to correspond with the permanent register, whereby the usefulness of the machine would be defeated; but by the arrangement shown in Fig. 7 this difficulty is obviated by the following means: The adjustable hand $a$ is made to move only in one direction, either by key on the actuating-lever C; and at every revolution it makes at the time it passes zero it moves the dial V one notch or inclination; therefore, the hand $a$ must be moved around as many times as there are indications or notches in the dial V, in order to cause the dial to perform one revolution; and at every revolution of this dial the tooth $b'$ moves the dial W one indication; consequently, in order to revolve the dial W once around, the hand $a$ must move a great many times around the zero-point before the numerals on the three dials B, V, and W can be made to coincide with the point from which they first started. Now, the time employed by the conductor in turning the hand $a$, so that he may defraud the company, will be so great that there will be no interval of time between the two ends of his route, whereby the above-named numerals can be made to coincide. These detecter-dials may be increased in number and in diameter, thereby decreasing the chances of defrauding the employer. The dials V W may be located beneath the dial B, with openings therein of sufficient size to expose each advancing numeral.

Figure 7:
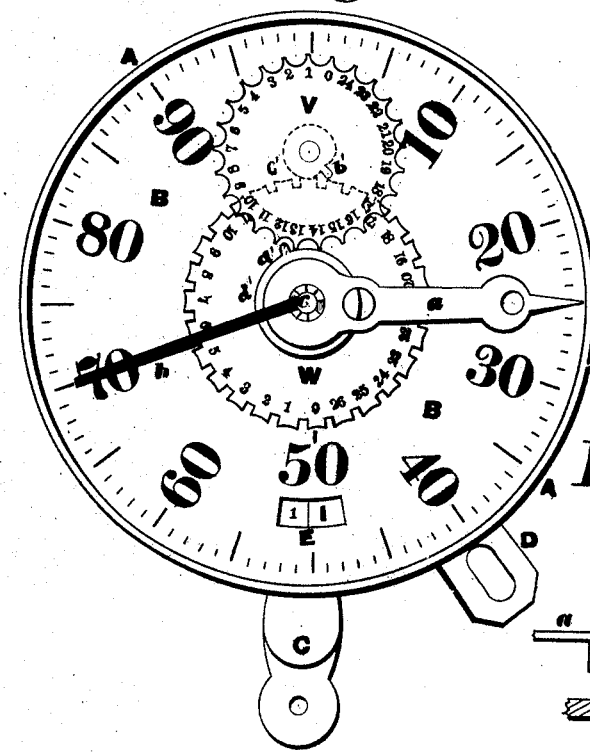
Fig. 7 represents a front view of a registering-machine, with two auxiliary dials, V W, thereon, the dial V being moved by the tooth $a'$, which projects from the hub $d'$, while the dial W is moved by the tooth $b'$ on the circumference of the hub $c'$.

The adjustable hand $a$ is connected to the shaft $c$ by a frictional sleeve, which nearly surrounds the shaft. Around this sleeve is a coil-spring, $s$, as shown in the Fig. 9. This spring is made smaller than the diameter of the sleeve, and, when placed thereon, contracts the sleeve, thereby causing it to hold firmly to the shaft, thus securing a constant, even, and any desired amount of tension or friction. To this sleeve the hand $a$ is secured. On top of this hand, and close around the shaft $c$, are wedge-shaped projections $r$ $r$, as shown in Figs. 9 and 7. A key is made to correspond with projections $r$ $r$, whereby the hand $a$ is moved in one direction only. The permanent hand $b$, as shown in Figs. 1, 7, 8, and 9, is connected to the shaft $c$, and cannot be moved only as the shaft moves. On the hub $g$ is a single tooth, $i$, which acts upon the dial or disk J, as seen in Figs. 2 and 3. This movement is constructed in a similar manner to the well-known Geneva stop. This stop keeps the dial or disk J locked in position when not engaged by the tooth $i$. This disk is centered on the cross-bar F. To avoid confusion and error in observing the numbers upon the disk J, through the oblong aperture E in the dial B during the engagement of the tooth, and while the disk J is in motion, a cover plate or guard, I, is employed, and is also centered with disk J, and so formed on its end next to the tooth $i$, that when the tooth actuates the disk J it also carries with it the guard-plate I until the tooth escapes and allows the spring $t$ to force the guard-plates suddenly over the last expired or receding numeral on the disk, and at the same time expose the next higher and advanced numeral. This guard-plate is provided with an aperture, K, at a point directly over the numerals on the disk J. Through this aperture and the corresponding aperture in the dial B the figures are observed. The entire movement of the guard-plate is determined by the stop $t$. The shaft $c$ is made to rotate by means of a toothed wheel, G, and is suspended by bearings formed in the cross-bar F and base N. The actuating-lever C is centered on the shaft $c$. Between the lever C and wheel G is the actuating-spring $w$, which can be made of any suitable wire, and so formed that when in position it presses the lever C against the stop in the base N, and also presses the wheel G up against the cross-bar F, thereby giving the desired friction to overcome the momentum of the wheel. The two arms or levers $d$ $d$, radiating from the spring $w$, are so constructed, when in position, that the spring presses them with a required force against a stop, $n$, and the actuating-lever C, so that, when the lever C is actuated, the spring is further contracted, thereby acquiring a still greater force, so that when the lever C is relieved by the power applied to compress the spring, it flies suddenly back to its former position. The motion of this lever C is governed by two stops, which prevent it from passing over a greater space than is required to move the wheel G the one-hundredth of one revolution.

The pawl L is centered on the lever C, and receives its motion therefrom. K is a pawl, which is used for a double purpose, to hold the wheel G from making a backward movement and to ring a bell. This pawl is centered on a fixed fulcrum, which projects from the base of the machine. A spring-wire is secured to the pawl, and terminates in a ball or hammer, $h$, as indicated by dotted lines in Figs. 2 and 3.

It will be observed that while the lever C is held firmly in position by the spring $w$ and its two radiating arms, the two pawls K and L engage each a tooth of the wheel G. Now, pull the lever C, and the pawl L is carried back over one tooth of the wheel, the wheel being in the meantime held firmly from receding by the pawl K. On releasing the actuating-lever C it is immediately thrown back by the actuating-spring $w$, which carries with it the wheel G, thereby causing the pawl K to rise on the receding tooth, and fall on the next succeeding one. By this action of the pawl K the momentum given to the hammer $h$ on the end of the spring-wire $o$ $o$ is sufficient to cause it to strike the bell H, thereby giving an alarm at the same instant that the hands $a$ and $b$ move forward one point on the dial B.

My object in constructing a machine to record by an actuating-spring is to overcome certain defects existing in a machine which is constructed to register simultaneously with the pull given the lever.

My objections to this machine are as follows: When the pull given the lever is communicated to the wheel the momentum to be overcome is greater or less, according to the power applied; consequently, a machine constructed in this way is liable to a great deal of wear, and can, if in the hands of one so disposed, be soon got out of order. Secondly, if a sudden pull or jerk be given to the lever C, and with insufficient force to carry the wheel forward one tooth, it will cause the hammer to strike the bell, thus giving an alarm without recording the movement.

These defects are overcome in my machine, it being made to work automatically by the force of the spring $w$. After releasing the actuating-lever C, the movements of the parts are always the same, and not liable to get out of order. Fig. 2 shows the spring in position around the stop $q$. While in this position it acts only as an actuating-spring, while in Figs. 3, 4, and 8 it serves a twofold purpose: first, as an actuating-spring, and, secondly, as a spring to keep the wheel G forced against the cross-bar or bridge F.

To prevent the wheel G from being carried forward more than one tooth at one pull on the actuating-lever C, and so as to insure a positive action of the bell-hammer pawl, I have placed a pin, $z$, firmly in the base N, and central to the pawl, thus bringing the pawl always between the pin and wheel; and the pawl is so formed that when being drawn back over the tooth of the wheel it coincides with the pin, excepting at the moment it changes from one tooth to another, it is firmly held between the teeth to prevent the movement of the wheel either backward or forward.

Street-cars are often so crowded that it becomes difficult for a detective to keep a record of the passengers getting in and out, and unless the registering device is so arranged that the conductor can and shall be compelled to register each and every fare directly after the same has been collected, and before another has been accepted, the machine loses in a great measure its value. Now, to obviate this defect I propose placing on both sides of the car a rod, R, shown in cross-section, Fig. 3, supported by suitable bearings, and at convenient distances. I secure handles, O, to the rod, which, on being turned, communicate motion, through the rod R and its connections, to the recording mechanism of the machine.

Another very important feature of my invention is to produce a machine which can be secured firmly in any desired position in cars or other places without delay, and which, in event of accident, can be removed and replaced by another instrument in a very few seconds without any interruption of the business. This object is accomplished by constructing the rear or back of the instrument with an opening, M, to admit into it a horn or hook so made that the action of the weight of the machine will tend to jam and hold the instrument against the side of the car or against any wall to which said horn or hook may be attached. This arrangement is shown in Figs. 11 and 12 of the drawings, in which N is the back of the machine, having the opening M, into which the horn or hook H' enters, and from its inclined or sloping shape causes the edge of the opening to jam behind the horn, and thus secure the machine and prevent rattling. For a further security a staple, passing through a slot in a projecting ear, receives a wedge or lock, which must be removed before the machine can be taken from its place. The staple may be formed to act as a spring to draw the edge of the back firmly against the horn, as shown at E' in Fig. 12. This device will permit the rapid changing of one machine for another without the usual delays attending calling a carpenter to make the change, as is done where machines are screwed directly to the wall. Valuable time of cars and the attendants is not lost from the necessity to take a car off its line upon any accidental occurrence taking place. I propose the use of a long rod, extending through the car. The rod may be round or square, or of any such shape as will receive and be operated by a wrench or handle. A portable wrench or handle, to be temporarily placed on the rod to actuate the machine, at any desired point along the length of the rod, is preferable to fixed handles, as without fixed handles the rod and machine is less likely to be tampered with. When the portable wrench is used the conductor or operator, after using it, removes it till he wishes to actuate the registering-machine again. The rod is made to actuate the machine by rotation or by end movement, as may be most convenient. The rotary motion or rocking is preferred. Fig. 14 shows the application to the rod of the portable wrench in the hand of the operator while working the registering-machine. It is to be understood that this registering-machine, though explained in particular reference to its application to vehicles or cars, is at the same time equally useful as a counter or registering-machine for printing-machines, engines, stamping-presses, or any other machine having moving parts. It is equally useful for keeping account of persons entering or leaving a theater or hall, passing a turnpike or entering a ferry, and for other like purposes.

The wrench may for some purposes be provided with a punch, P', attached to it; or, if suitable jaws are fitted upon any ordinary punch, such an instrument will conveniently answer the purposes of both; also, to make one instrument serve for as many purposes as is possible or necessary, shears and wrench may be in one piece with or without a punch. Such a combined implement would be useful to cut or punch tickets, as is usual to do when they are used on a railroad.

A hole or holes may be made in the rod R to admit a portable pin or lever, which will also serve to move the rod. The wrench, however, is deemed preferable. A portable pin is shown in Fig. 16.

In this specification the words "hands," "index-hand," and "index" are used synonymously.

I claim—

1. The actuating-lever C and spring $w$, in combination with a common central pivot around which they both turn or act, substantially as set forth.

2. The combination of an actuating-lever and a going-wheel of a spring, arranged to actuate the wheel by its force in one plane, and to furnish force to produce friction in another plane, substantially as set forth.

3. One or more dials, W V, in combination with an adjustable hand, $a$, for the purpose of detecting any change in the relative positions of adjustable and permanent hands making indications on a disk or dial, substantially as set forth.

4. The combination of a movable hand or index and a permanent hand or index of a registering apparatus, and an alarm actuated by the same prime mover, substantially as set forth.

5. The combination of the index-hands of a registering-machine and one or more dials, W V, working in combination with a registering-disk, J, substantially as set forth.

6. The combination, with a ratchet-wheel, of the stop $z$ and pawl L, provided with inclined recess $z'$ to lock the ratchet-wheel at the termination of its predetermined motion, substantially as set forth.

7. The combination, with a frictional or elastic sleeve, of a clasping-spring for the purpose of producing friction in order that the adjustable hand $a$ may be moved by a key independent of any motion of its supporting-shaft, substantially as set forth.

8. The rod R, provided with one or more handles fixed upon the same, in combination with a registering mechanism, and actuating such registering apparatus substantially as set forth.

9. The rod R, provided with one or more portable or detached wrenches or handles, in combination with a registering mechanism, and actuating such registering apparatus or mechanism substantially as set forth.

10. The combination, with a registering mechanism and an actuating-lever, of an intermediate spring or motor placed under tension by the movement of the actuating-lever impelled by the hand of the operator in one direction, and setting in motion the registering mechanism upon the return movement of the lever in the other direction, substantially as set forth.

11. In combination with the mechanism of a registering-machine actuated by a wrench or handle worked by the hand of the operator, a spring to drive said mechanism by the reaction of the same after it has been put into a state of tension, substantially as set forth.

12. The means of attaching to, and releasing the instrument from, the place where used, by means of the hook or horn and the parts bearing upon the same, substantially as set forth.

JOHN B. BENTON.

Witnesses:
 CARL FREDERICI,
 EDWARD A. GRIFFITH.